United States Patent
Yamamoto

(10) Patent No.: US 8,366,276 B2
(45) Date of Patent: Feb. 5, 2013

(54) FILTER DEVICE WITH CONTROL FOR FILTER WINDING AND PROJECTION TYPE DISPLAY APPARATUS

(75) Inventor: Masaya Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 303 days.

(21) Appl. No.: 12/821,332

(22) Filed: Jun. 23, 2010

(65) Prior Publication Data

US 2010/0328620 A1    Dec. 30, 2010

(30) Foreign Application Priority Data

Jun. 25, 2009   (JP) ................................ 2009-150625

(51) Int. Cl.
*G03B 21/18*  (2006.01)

(52) U.S. Cl. ............................................ 353/61

(58) Field of Classification Search ............ 353/57, 353/61

See application file for complete search history.

(56) References Cited

U.S. PATENT DOCUMENTS

| | | | | |
|---|---|---|---|---|
| 4,407,577 | A * | 10/1983 | Nakamura | 396/403 |
| 5,337,113 | A * | 8/1994 | Kagawa et al. | 396/568 |
| 2007/0144950 | A1* | 6/2007 | Choi | 210/91 |
| 2010/0026967 | A1* | 2/2010 | Yamagishi | 353/61 |

FOREIGN PATENT DOCUMENTS

| | | |
|---|---|---|
| JP | 8-152242 | 6/1996 |
| JP | 2006-145053 | 6/2006 |
| JP | 2008-262033 | 10/2008 |
| JP | 2008-281970 | 11/2008 |
| WO | WO 2008090825 A1 * | 7/2008 |

* cited by examiner

*Primary Examiner* — Thanh Luu
*Assistant Examiner* — Renee Naphas
(74) *Attorney, Agent, or Firm* — Hamre, Schumann, Mueller & Larson, P.C.

(57) ABSTRACT

A filter device includes: a filter unit including a housing in which a roll filter stretched between a feeding shaft and a take-up shaft is housed, the housing including, between the two shafts, an opening for exposing a part of the filter; a filter installation detection sensor for detecting installation of the filter unit; a filter winding driving unit for taking up or rewinding the installed filter; and a control unit for controlling operations of the filter winding driving unit based on a detection signal from the filter installation detection sensor. When the control unit determines based on the detection signal from the filter installation detection sensor that the filter is installed, the control unit causes the filter winding driving unit to rewind the filter by a predetermined amount and determines whether the filter is new or not based on the rewinding. By detecting filter replacement, information on the replaced filter can be reset.

7 Claims, 5 Drawing Sheets

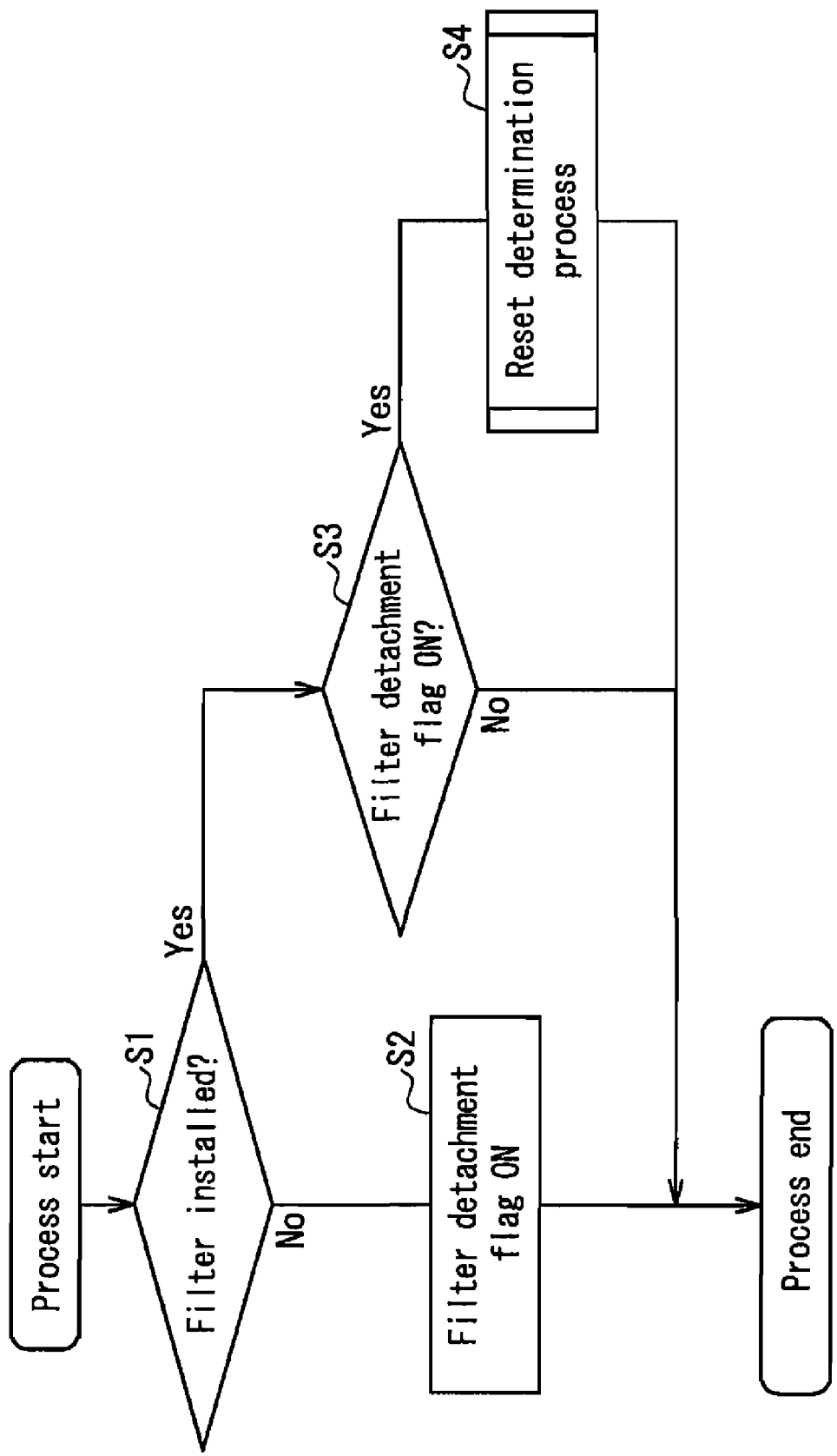
F I G. 5

FILTER DEVICE WITH CONTROL FOR FILTER WINDING AND PROJECTION TYPE DISPLAY APPARATUS

BACKGROUND OF INVENTION

1. Field of the Invention

The present invention relates to a filter device using a detachable roll filter unit and a projection type display apparatus using the filter device.

2. Description of Related Art

Projection type display apparatuses, such as a projector, have been used in a variety of circumstances, home-theater, commercial uses and so on. Projection type display apparatuses include image display elements such as a liquid crystal panel and a DMD (digital mirror device), and magnify and project an optical image formed by concentrating strong light from a light source, such as a lamp, onto the image display elements and modulating the concentrated light in response to an input image signal. The image display elements subjected to strong light, the light source itself, the apparatus power supply, etc. could be damaged by heat unless they are cooled adequately. For this reason, cooling fans that provide a strong cooling effect generally are used in projection type display apparatuses so as to blow air into the apparatuses.

However, when a flow of air is produced by an air blow from a cooling fan, dust in the air enters the apparatus, so that it is necessary to remove the dust by providing the air intake with a filter. However, when the dust accumulates on the filter, the cooling effect drops. Therefore, many projection type display apparatuses use detachable roll filters.

In a case where a detachable roll filter is used, the cooling effect can be kept constant by taking up the filter when a predetermined amount of dust accumulates on the filter. However, since the length of the filter that can be taken up is fixed, the filter needs replacing when it is taken up entirely.

After replacing the filter, it is necessary to reset information on the replaced filter stored in the projection type display apparatus. Specifically, the information includes the take-up amount, estimated replacement time, an error and the like. By resetting these kinds of information, the time over which the new filter can be used can be estimated precisely.

Conventionally, after replacing a filter, the information on the replaced filter has been reset by a user pressing a button for resetting the filter information or selecting reset from a guidance menu displayed by the projection type display apparatus. However, when a user forgets to reset the information after replacing the filter, the time over which the replacing filter can be used cannot be estimated precisely.

As a measure directed to this problem, JP 2006-145053 A discloses a system in which a serial number is read at regular intervals from an IC tag attached to a filter and the filter information is reset automatically when the serial number changes. In this system, when the serial number read from the IC tag changes, the system determines that the filter is replaced and resets the information on the replaced filter. However, even when the replacing filter is not new, the system resets the information on the replaced filter.

Furthermore, the system is not configured to use a rolled filter and it cannot be said that the system is suited for using a rolled filter.

SUMMARY OF THE INVENTION

With the foregoing in mind, it is an object of the present invention to provide a filter device capable of accurately resetting filter information at the time of replacing a detachable roll filter unit and a projection type display apparatus using the filter device.

To solve the above-described problem, the filter unit of the present invention includes: a filter unit including a housing in which a roll filter stretched between a feeding shaft and a take-up shaft is housed, the housing including, between the two shafts, an opening for exposing a part of the filter; a filter installation detection sensor for detecting installation of the filter unit; a filter winding driving unit for taking up or rewinding the installed filter; and a control unit for controlling operations of the filter winding driving unit based on a detection signal from the filter installation detection sensor. When the control unit determines based on the detection signal from the filter installation detection sensor that the filter is installed, the control unit causes the filter winding driving unit to rewind the filter by a predetermined amount and determines whether the filter is new or not based on the rewinding.

According to the filter device of the present invention, filter replacement is detected with certainty and filter information is reset automatically. Therefore, the user can avoid spending his time and effort in resetting the filter information.

BRIEF DESCRIPTION OF THE DRAWINGS

FIG. 5 is a flowchart showing an exemplary operation of the control system for detecting the installed state of a filter.

DETAILED DESCRIPTION OF THE INVENTION

The filter device of the present invention, having the basic structure as described above, also can have improved configurations as follows.

That is, the filter device of the present invention further may include a sensor for detecting rewinding of the filter performed by the filter winding driving unit, and when the sensor does not output a signal corresponding to detection of rewinding of the filter for a certain period of time during the rewinding of the filter by the predetermined amount, the control unit may determine that the filter is new.

Further, when the control unit determines that the filter is new, the control unit may reset information on the filter.

Further, the control unit may obtain the detection signals from the filter installation detection sensor over a plurality of times and when all of the detection signals indicate that the filter is installed, the control unit may determine that the filter is installed.

Further, when the control unit determines based on the detection signal from the filter installation detection sensor that the filter is not installed, the control unit may turn on a filter detachment flag, and when the detection signal from the filter installation detection sensor indicates that the filter is installed while the filter detachment flag is on, the control unit may determine that the filter is installed.

Further, after determining that the filter is installed, the control unit may cause the filter winding driving unit to rewind the filter by a predetermined amount after a lapse of predetermined time.

Further, the filter device of the present invention further may include a starting end detection portion for detecting a starting end of the filter along with the rewinding of the filter, and when the starting end detection portion cannot detect the starting end of the filter during the rewinding of the filter by a predetermined amount, the control unit may cause the filter winding driving unit to take up the filter by the predetermined amount.

The projection type display apparatus of the present invention may include: a light source unit; an image forming unit for forming an image by modulating light from the light source unit; a projection optical system for magnifying and projecting the formed image; a housing in which the light source unit, the image forming unit and the projection optical system are housed; an inlet and an outlet provided on the housing; a blower unit for taking in air through the inlet and letting out air through the outlet; and the filter device having any of the above-described configurations disposed at the inlet.

(Embodiment)

Figure 1:
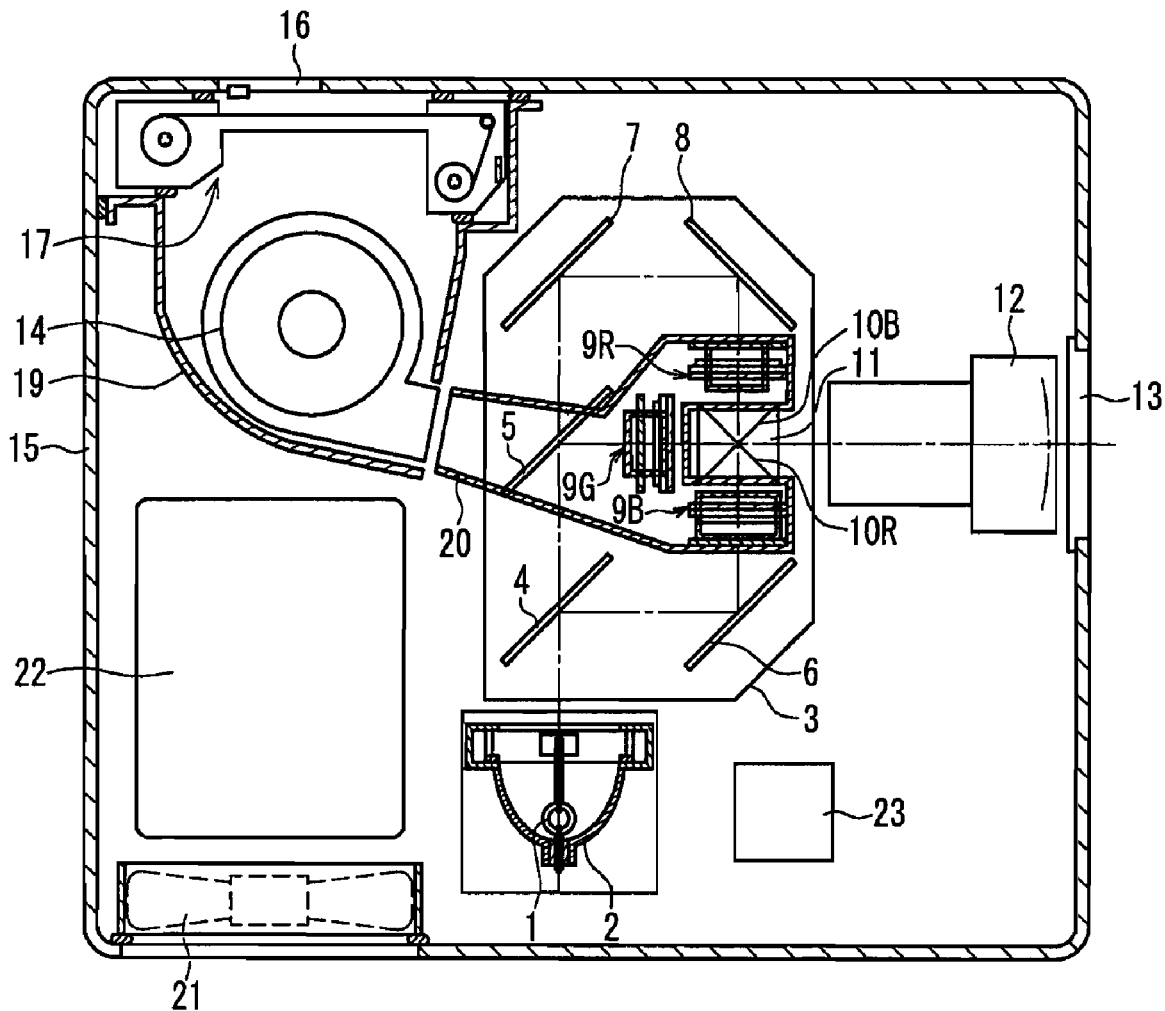
FIG. 1 is a cross-sectional view showing an overall planer configuration of a projection type display apparatus according to one embodiment of the present invention.

Hereinafter, a Projection Type Display Apparatus According to One Embodiment of the present invention will be described with reference to the drawings. FIG. 1 is a cross-sectional view showing the overall planar configuration of the projection type display apparatus. One of the features of a filter device adopted in this projection type display apparatus is that the filter device is configured to reset filter information accurately at the time of replacing a detachable roll filter unit. Therefore, the optical system is not limited to one with a particular configuration and the optical system illustrated in the present embodiment is a typical optical system. Thus, in the following description, the optical system will be explained only briefly.

In FIG. 1, light emitted by a lamp 1 as a light source is reflected by a reflection mirror 2 frontwards, and enters an optical unit 3. The incident light is separated into red, green and blue colored light beams through dichroic mirrors 4 and 5 and total reflection mirrors 6, 7 and 8.

The intensity of the separated light beams of the respective colors is modulated by liquid crystal light bulbs 9R, 9G and 9B as image display elements based on an external input signal (not shown). These light beams are combined on one optical path by a combine prism 11 including dichroic reflection films 10R and 10B, and then the combined light beam enters a projection lens 12. The projection lens 12 is designed to magnify images of the liquid crystal light bulbs 9R, 9G and 9B and to project them on a screen (not shown) placed in front of the apparatus.

An air intake fan 14 provided adjacent to the optical unit 3 introduces outside air (air with a relatively low temperature) into the apparatus through a housing air intake 16 provided on a side surface of a housing 15. The outside air taken in by the air intake fan 14 is guided to an air intake duct 19 through a filter 18 (FIG. 2) in a filter unit 17 and is guided to an optical unit duct 20 in intimate contact with a blowoff opening of the fan.

The optical unit duct 20 is provided with red, green and blue apertures (not shown) at the positions respectively corresponding to the bottom of the liquid crystal light bulbs 9R, 9G and 9B described above. The air issued from these apertures takes away heat from the liquid crystal light bulbs 9R, 9G and 9B and then is let out by an exhaust fan 21. During this process, the air to be let out also takes away heat from the lamp 1, mechanical components in the vicinity of the lamp 1, and a power supply unit 22.

In such a cooling process, external dust taken in together with outside air could adhere to the periphery of the liquid crystal panel and to the light source unit, and may cause problems such as early deterioration of luminance and color unevenness in projected images as a result. In order to prevent these problems, the filter unit 17 is provided to face the housing air intake 16.

A control unit 23 has the function of controlling operations of the filter unit 17 as a part of the functions of controlling overall operations of the projection type display apparatus. A detection output from a sensor for gathering data for controlling operations of the filter unit 17 is inputted to the control unit 23, and the control unit 23 controls the filter unit 17 on the basis of the sensor output.

Figure 2:
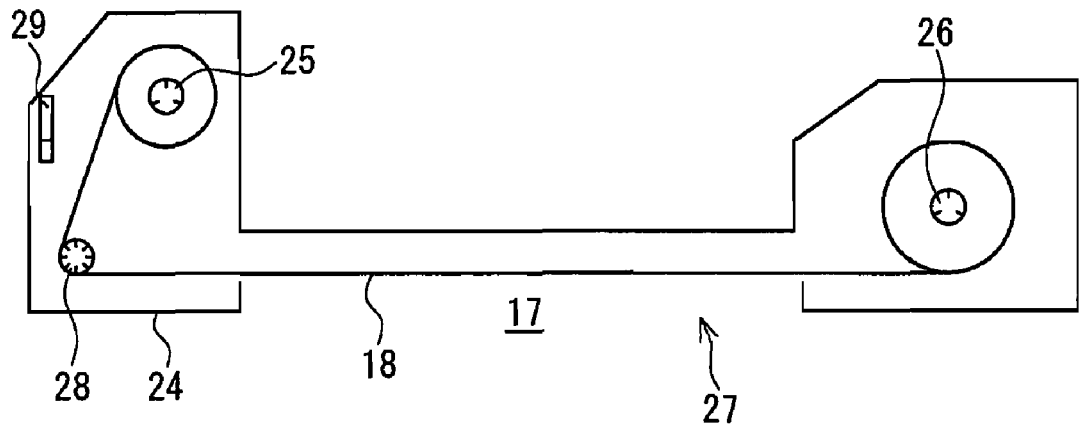
FIG. 2 is a diagram showing a basic configuration of a filter unit.

Next, the structure of the filter unit 17 will be described with reference to FIG. 2. The filter unit 17 has a detachable roll filter configuration and includes a filter feeding shaft 25 and a filter take-up shaft 26 in a small housing 24. The filter 18 is stretched between the two shafts. The small housing 24 includes, between the two shafts, an opening 27 for allowing air from the housing air intake 16 of the projection type display apparatus to flow in. Further, a rotation pulse detection rotary shaft 28 is disposed between the filter feeding shaft 25 and the filter take-up shaft 26. The rotation pulse detection rotary shaft 28 is positioned on the path over which the filter 18 is taken up or rewound and is pressed against the filter 18, allowing it to rotate as the filter 18 is taken up or rewound. A filter installation detection protrusion 29 used in detecting installation of the filter unit 17 further is provided in the small housing 24.

Figure 3:
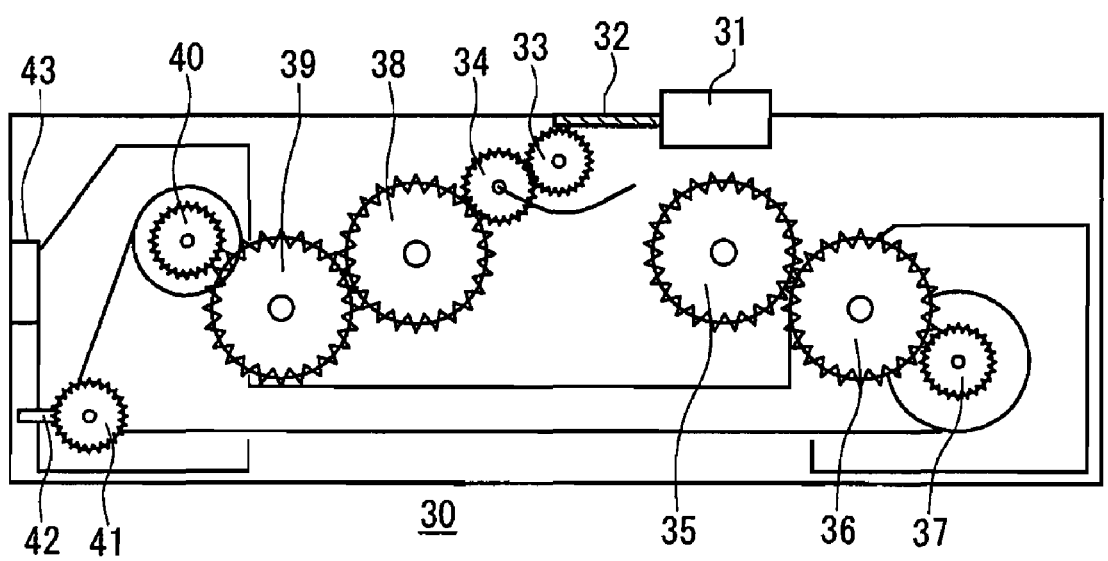
FIG. 3 is a diagram showing a configuration of a filter device.

FIG. 3 is a diagram showing a configuration of a filter device 30 disposed in the projection type display apparatus. The figure shows a state in which the filter unit 17 is installed on the filter device 30. The filter device 30 includes a take-up motor 31 for providing constant-speed driving power, a drive shaft 32 for transmitting the driving power from the motor 31, a motor power transmission gear 33 for transmitting the power from the drive shaft 32 and a forward/reverse switching gear 34 for switching between the normal and reverse rotations in the take-up direction.

Furthermore, normal rotation power transmission gears 35, 36 for transmitting power during the normal rotation and a normal rotation gear 37 that is rotated by the power transmitted by the normal rotation power transmission gears 35, 36 are provided. The filter take-up shaft 26 of the filter unit 17 shown in FIG. 2 engages with the normal rotation gear 37 and takes up the filter 18 as the normal rotation gear 37 rotates. Further, reverse rotation power transmission gears 38, 39 for transmitting power during the reverse rotation and a reverse rotation gear 40 that is rotated by the power transmitted by the reverse rotation power transmission gears 38, 39 are provided. The filter feeding shaft 25 of the filter unit 17 engages with the reverse rotation gear 40 and rewinds the filter 18 as the reverse rotation gear 40 rotates.

Further, a rotation detection gear 41 that rotates through a link with the rotation pulse detection rotary shaft 28 of the filter unit 17 and a photosensor 42 for generating a pulse by detecting projections and depressions of the rotation detection gear 41 are provided. Further, a filter installation detection sensor 43 for determining the presence or absence of the filter installation detection protrusion 29 of the filter unit 17 is provided. Detection signals from the photosensor 42 and the filter installation detection sensor 43 are supplied to the control unit 23.

Next, the operation at the time of installing the filter unit 17 to the filter device 30 will be described. The filter unit 17 shown in FIG. 2 is detachable, and when it is installed on the filter device 30 shown in FIG. 3, the filter feeding shaft 25 and the reverse rotation gear 40, the filter take-up shaft 26 and the normal rotation gear 37, and the rotation pulse detection rotary shaft 28 and the rotation detection gear 41 are coupled to each other, respectively. When they are respectively coupled to each other, the filter 18 can be taken up or rewound as the motor 31 rotates. Further, when the filter unit 17 is installed on the filter device 30, the filter installation detection protrusion 29 activates the filter installation detection sensor 43. On the basis of the state of the filter installation detection sensor 43, the control unit 23 determines whether the filter is installed or detached.

Hereinafter, operations of the filter device configured as above will be described. When the control unit 23 causes the filter take-up motor 31 to drive, the power is transmitted to the motor power transmission gear 33 through the drive shaft 32. The power transmitted to the motor power transmission gear 33 then is transmitted to the next gear through the forward/reverse switching gear 34. By controlling the forward/reverse switching gear 34 through the control unit 23, the position of the forward/reverse switching gear 34 is changed and the take-up direction of the filter 18 changes accordingly.

For taking up the filter in the normal direction of rotation, power of the forward/reverse switching gear 34 is transmitted to the normal rotation power transmission gears 35, 36 and to the normal rotation gear 37 to rotate the filter take-up shaft 26. The filter 18 is fed from the filter feeding shaft 25 as the filter take-up shaft 26 rotates. Similarly, for rewinding the filter in the reverse direction of rotation, power of the forward/reverse switching gear 34 is transmitted to the reverse rotation power transmission gears 38, 39 and to the reverse rotation gear 40 to rotate the filter feeding shaft 25. The filter 18 is fed from the filter take-up shaft 26 as the filter feeding shaft 25 rotates. The rotation pulse detection rotary shaft 28 and the rotation detection gear 41 rotate as the filter 18 is taken up. The photosensor 42 detects the rotation of the rotation detection gear 41 as a High and Low pulse signal and the control unit 23 obtains the detected pulse signal. Traveling of the filter 18 can be detected on the basis of the detection signal from the photosensor 42.

Figure 4:
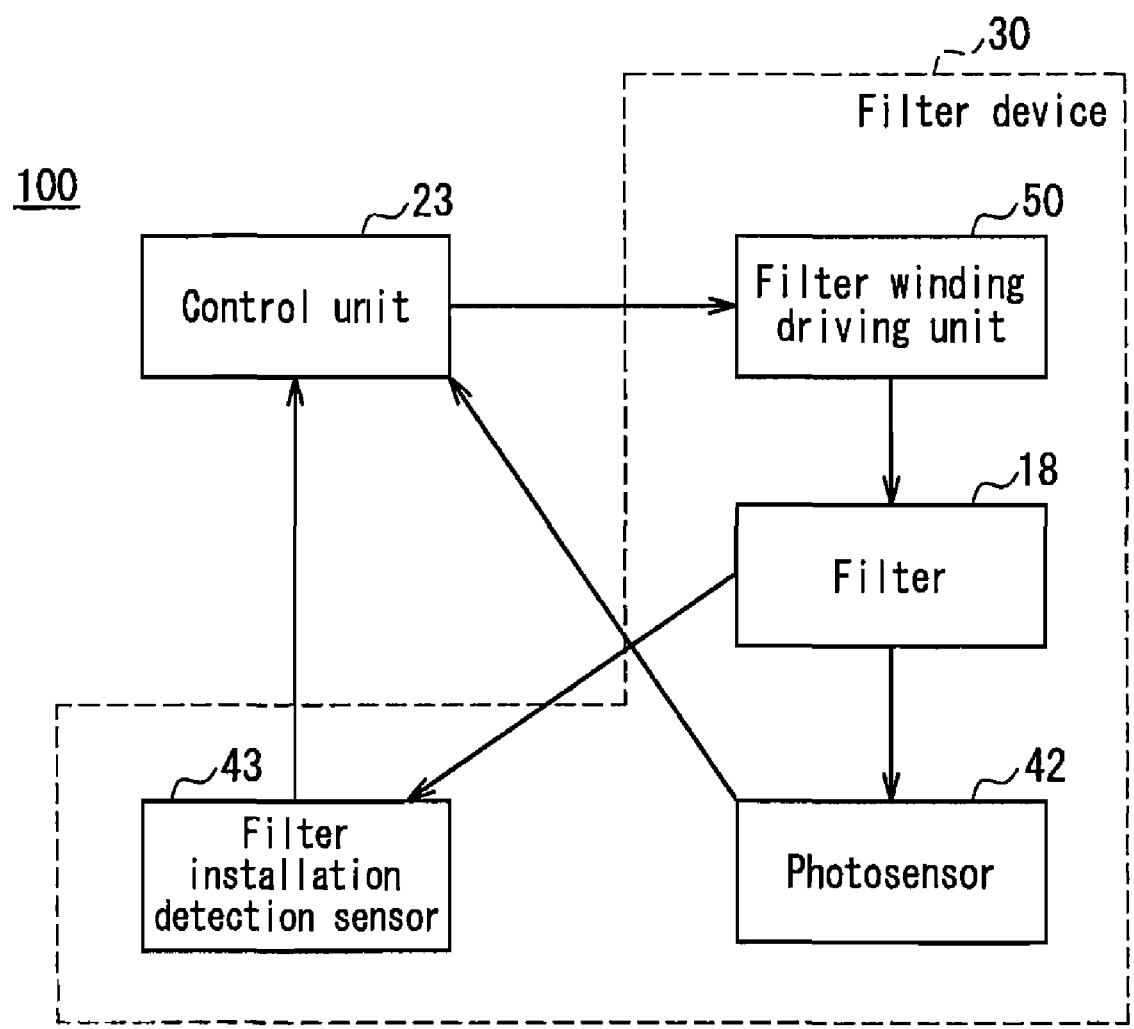
FIG. 4 is a block diagram showing a configuration of a control system of the filter device according to one embodiment of the present invention.

Now referring to FIG. 4, a control system of the filter device in the projection type display apparatus will be described in detail. FIG. 4 is a block diagram showing a configuration of a control system 100 of the filter device.

The control system 100 is composed of each component of the filter device 30 and a part of the control unit 23 for controlling the entire projection type display apparatus. In the filter device 30, each of a filter winding driving unit 50, the filter 18, the photosensor 42 and the filter installation detection sensor 43 constitutes a unit for control operation. The filter winding driving unit 50 includes the various components shown in FIG. 3, i.e., the motor 31 for driving the filter unit 17, the drive shaft 32, the motor power transmission gear 33, the forward/reverse switching gear 34, and the gears 35 to 41. The filter 18, the photosensor 42 and the filter installation detection sensor 43 are as described with reference to FIGS. 1 to 3.

For example, the control unit 23 controls driving of the motor of the filter winding driving unit 50 and processes information from the filter device 30. In response to an instruction from the control unit 23, the filter winding driving unit 50 takes up or rewinds the filter 18 in the installed filter unit 17 (not shown). The photosensor 42 generates pulses as the filter 18 is taken up or rewound and supplies the pulses to the control unit 23. The filter installation detection sensor 43 detects the presence or absence of the filter 18 (filter unit 17) and supplies the result to the control unit 23.

When the filter installation detection sensor 43 detects that the state of the filter is changed from absent to present, the control unit 23 determines whether to carry out reset or not. In this determination process, the filter winding driving unit 50 rewinds the filter 18 at a constant rotation speed. In so doing, the photosensor 42 converts the rewound amount of the filter 18 to a pulse signal and transmits the signal to the control unit 23. The control unit 23 counts the number of Highs or Lows of the pulse signal. When the pulse signal becomes undetectable within a predetermined period of time, the control unit 23 determines that a new filter 18 (filter unit 17) is installed and information on the old filter 18 held in the control unit 23 is reset. The user may be notified through a display unit (not shown) that the information has been reset. When a predetermined number of pulses are detected within the predetermined period of time, the control unit 23 determines that a used filter 18 is installed, and the filter 18 is taken up by the same amount as the rewound amount.

Next, a description will be given of an exemplary flow of determining whether to carry out the reset determination process or not. FIG. 5 is a flowchart showing an exemplary operation of detecting the installed state of the filter 18 (filter unit 17).

When the control unit 23 starts managing the installed state of the filter 18, whether the filter 18 is installed or not is determined at a predetermined cycle time through the filter installation detection sensor 43 (step S1). The control unit 23 preferably obtains the information from the filter installation detection sensor 43 over a plurality of times and determines that the information is correct only when all of the pieces of information obtained over a plurality of times match with each other.

When the filter 18 is not installed (No), a filter detachment flag is turned ON (S2) and the operation ends. The control unit 23 may turn on a warning LED with the use of this flag or may cause the display unit (not shown) to display a message.

When the filter 18 is installed (Yes), the value of the filter detachment flag is referenced (S3). When the flag is ON (Yes), in other words, when the filter 18 is reinstalled after once being detached, the reset determination process in which whether to reset filter information or not is determined is carried out (S4). When the filter detachment flag is not ON (No), the operation ends without carrying out the reset determination process (S4).

Figure 6:
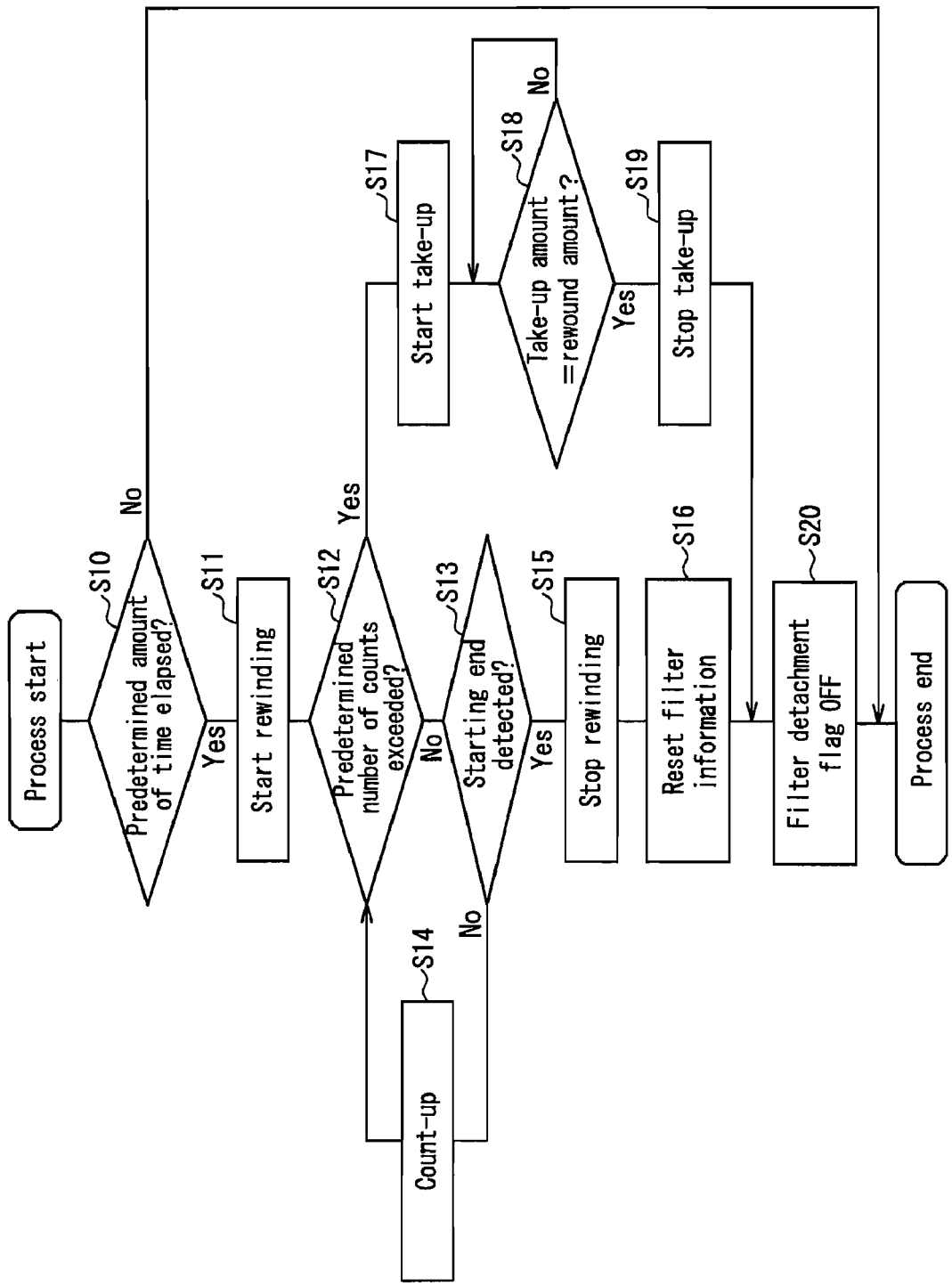
FIG. 6 is a flowchart showing an exemplary operation for determining whether to reset filter information or not.

Next, the reset determination process (S4) shown in the flowchart of FIG. 5, in other words, an exemplary flow of resetting filter information automatically, will be described with reference to FIG. 6. FIG. 6 is a flowchart showing an exemplary operation in the reset determination process.

First, whether a predetermined amount of time has elapsed from the installation of the filter 18 (filter unit 17) or not is checked (step S10). If the predetermined amount of time has elapsed (Yes), filter rewinding starts (S11). The reason that the rewinding is not performed immediately is to prevent the hands and clothes of a person who replaced the filter from becoming entangled.

As the rewinding starts, information from the photosensor 42 is checked regularly. And through a loop process of steps S12, S13 and S14, when pulse signals are sent from the photosensor 42, it is determined that the filter is traveling and count-up is performed (S14). That is, it is determined at step S12 whether or not a predetermined number of counts has been exceeded, and if not (No), it is determined whether or not the starting end of the filter 18 is detected (S13). If the starting end is not detected (No), count-up is performed at step S14 and the operation returns to step S12.

In the starting end detection at step S13, when no pulse is sent from the photosensor 42 for a certain period of time, it means that the traveling of the filter is stopped. Thus, it is determined that the starting end is detected (S13). That is, the photosensor 42 and the control unit 23 form a starting end detection portion. Any of other suitable configurations may be employed as the starting end detection portion. However, since the rotation also stops in the event of failure, it is necessary to distinguish between a failure and starting end detection. For example, when no pulse is sent, not even once, from the photosensor 42 from the start of rewinding, it is determined as a failure.

When the starting end is detected at step S13 (Yes), the rewinding is stopped (S15) and filter information is reset (S16). Thereafter, the filter detachment flag is turned OFF (S20).

When the starting end cannot be detected at step S13 even when the rewinding is carried out for a certain period of time, in other words, when at the step S12 the predetermined number of counts has been exceeded (Yes), take-up of the filter in the normal direction starts (S17). When the take-up amount and the rewound amount coincide with each other (S18), the take-up is stopped (S19). Thereafter, the filter detachment flag is turned OFF (S20).

In order to prevent a mistake in distinguishing between a failure and starting end detection, it is also effective to confirm with the user through the display unit (not shown) whether to reset the information or not before performing the reset.

Although the present invention has been described on the basis of its preferred embodiment, the configurations of the filter device and the projection type display apparatus of the present invention are not limited to those illustrated in the embodiment. Configurations resulting from making a variety of modifications and changes to the configurations illustrated in the embodiment are also within the scope of the present invention.

As described above, the filter device according to the present invention can automatically detect filter replacement and reset filter information. Thus, it is useful as a filter device that improves a projection type display apparatus in its user maintainability.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A filter device comprising:
   a filter unit including a housing in which a roll filter stretched between a feeding shaft and a take-up shaft is housed, the housing including, between the two shafts, an opening for exposing a part of the filter;
   a filter installation detection sensor for detecting installation of the filter unit;
   a filter winding driving unit for taking up or rewinding the installed filter;
   a control unit for controlling operations of the filter winding driving unit based on a detection signal from the filter installation detection sensor; and
   a sensor for detecting rewinding of the filter performed by the filter winding driving unit,
   wherein when the control unit determines based on the detection signal from the filter installation detection sensor that the filter is installed, the control unit causes the filter winding driving unit to rewind the filter by a predetermined amount, and when the sensor does not output a signal corresponding to detection of rewinding of the filter for a certain period of time during the rewinding of the filter by the predetermined amount, the control unit determines that the filter is new.

2. The filter device according to claim 1, wherein when the control unit determines that the filter is new, the control unit resets information on the filter.

3. The filter device according to claim 1, wherein the control unit obtains the detection signals from the filter installation detection sensor over a plurality of times and when all of the detection signals indicate that the filter is installed, the control unit determines that the filter is installed.

4. The filter device according to claim 1, wherein when the control unit determines based on the detection signal from the filter installation detection sensor that the filter is not installed, the control unit turns on a filter detachment flag, and when the detection signal from the filter installation detection sensor indicates that the filter is installed while the filter detachment flag is on, the control unit determines that the filter is installed.

5. The filter device according to claim 1, wherein after determining that the filter is installed, the control unit causes the filter winding driving unit to rewind the filter by a predetermined amount after a lapse of predetermined time.

6. The filter device according to claim 1, further comprising a starting end detection portion for detecting a starting end of the filter along with the rewinding of the filter,
   wherein when the starting end detection portion cannot detect the starting end of the filter during the rewinding of the filter by a predetermined amount, the control unit causes the filter winding driving unit to take up the filter by the predetermined amount.

7. A projection type display apparatus comprising:
   a light source unit;
   an image forming unit for forming an image by modulating light from the light source unit;
   a projection optical system for magnifying and projecting the formed image;
   a housing in which the light source unit, the image forming unit and the projection optical system are housed;
   an inlet and an outlet provided on the housing;
   a blower unit for taking in air through the inlet or letting out air through the outlet; and
   the filter device according to claim 1 disposed at the inlet.

* * * * *